Sept. 23, 1952         A. W. SCHAFER         2,611,403
MACHINE FOR PITTING FRUITS SUCH AS DATES
Filed Sept. 24, 1949         6 Sheets-Sheet 2

Patented Sept. 23, 1952

2,611,403

UNITED STATES PATENT OFFICE 2,611,403

MACHINE FOR PITTING FRUITS SUCH AS DATES

Arnold W. Schafer, Urbana, Ohio, assignor to The W. H. Marvin Company, Urbana, Ohio, a corporation of Ohio Application September 24, 1949, Serial No. 117,592

3 Claims. (Cl. 146—17)

This invention relates to machines for pitting fruit and more particularly to such a machine for the pitting of dates and the like.

There are certain fruits, such as dates for example, in which because of the elongated shape of the pit and because of the sticky character of the fruit itself, removal of the pits by machine presents a difficult problem. It has been the practice to ship quantities of such fruits with the pits remaining in the fruit, although it would be preferable in many cases to have pitted fruit since such fruit has greater marketability and additional fields of utility. With dates in particular it has been the practice to pit the dates by hand, which not only entails substantial expense resulting in increased cost of the pitted dates, but also involves the slitting of the side of the date from end to end in order to remove the pit, thereby breaking down the natural structure of the fruit so that it is subjected to increased crushing and damage in shipment and likewise exposing a substantial part of the inner cell structure to outside contamination and oxidation. In fact, the customary pitted date package, particularly after an extensive period of shipment such as is incident to the importation of dates from foreign countries where they are grown in quantities, frequently shows considerable evidence of this crushing and deformation, the dates having largely been deformed and pressed out of their natural shape and into a gummy mass.

The present invention provides a highly effective machine for the pitting of such fruit as dates and similar fruit where it is difficult to remove the pit. The operation is performed quickly and with complete reliability so that assurance is provided that all of the fruit will be effectively pitted. The pitting operation does not result in slitting or breaking down the body of the fruit, but involves the removal of the pit through the end of the fruit, forming an aperture no larger than the minimum dimension of the pit itself, leaving the main body of the fruit intact. As a result, the fruit retains its normal shape and may be packed and shipped substantially without crushing or other damage, presenting both a better appearance and likewise exhibiting improved keeping qualities in comparison with the practice followed heretofore.

The invention also provides for effective removal of the stem cap of the date so that the stem cap, or such part of it as adheres to the fruit, is removed along with the stripping of the pit therefrom. The machine provides for the handling of dates of a range of sizes, such that both small and large dates are effectively handled and stripped with equal assurance and speed. The machine is so constructed that in any case in which the pit is not properly stripped and removed from the fruit, the operator is immediately made aware of such condition and can take steps to correct it so that complete assurance is provided that no unpitted fruit will be delivered by the machine.

It is therefore the principal object of the invention to provide such a machine for the rapid and reliable pitting of fruit such as dates in such a way as to retain the essential structure of the fruit, and substantially without crushing or cutting the body thereof.

It is a further object to provide such a machine which is at all times maintained in a clean and sanitary condition.

It is also an object to provide such a machine in which the feeding operation is automatically interrupted in response to the failure of the pit to be properly stripped from the date at any time.

It is a still further object to provide a fruit pitting machine in which the fruit is clamped in a predetermined stripping position regardless of its size, such that it may be uniformly engaged by a pitting plunger to strip the pit therefrom.

It is also an object to provide simple and effective means for keeping the fruit receiving buckets both clean and in a relatively cool condition, and for facilitating the operation of the pitting plunger by warming and lubricating the same.

It is another object to provide a machine in which the parts are positively and accurately driven and so interconnected that all steps occur in predetermined correlated relation with each other and with the bucket in the stripping position being always located in precision relationship with respect to the stripping mechanism.

Other objects and advantages will be apparent from the following description, the accompanying drawings, and the appended claims.

Figure 1:
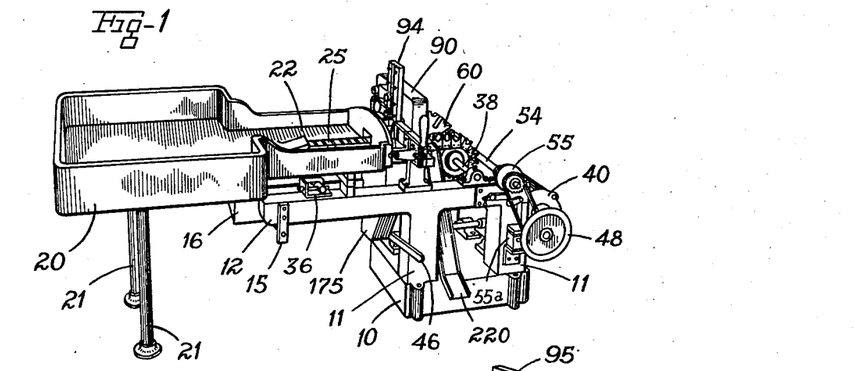
Fig. 1 is a perspective view of the machine showing the feeding tray in operative position.

Referring to the drawings which disclose a preferred embodiment of the invention, the machine as a whole is shown in Fig. 1 in which there is shown a base member 10 on which there are supported the pedestal portions 11 which carry side rails 12 and 13. Side rails 12 and 13 extend in generally parallel and overhanging relation with respect to the base and are connected at the overhanging ends by a cross brace 15 which serves to support one end of a water tank 16 therebetween, the tank being carried at its other end by means of a cross bar 17 supported from the pedestals 11. An overflow outlet 18 is provided to maintain a predetermined level in the tank.

A receiving tray 20 is mounted on legs 21 and is adapted to receive the bulk fruit such as the dates to be pitted. It has a forwardly extending feeding portion 22 which is centrally slotted to straddle a series of fruit receiving buckets, which travel from left to right therethrough as shown in Fig. 1. The tray is shown in Fig. 1 but has been removed from the remaining views in order more clearly to show the construction of the mechanism.

Figure 2:
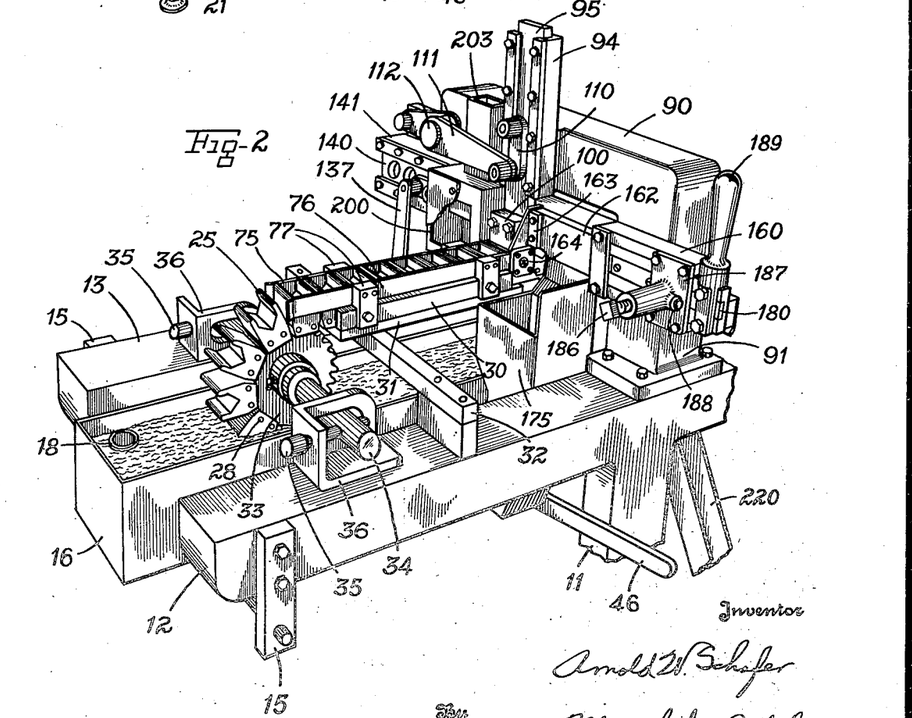
Fig. 2 is a perspective view of the machine on a larger scale from the operator's side with the feeding tray removed.
Figure 3:
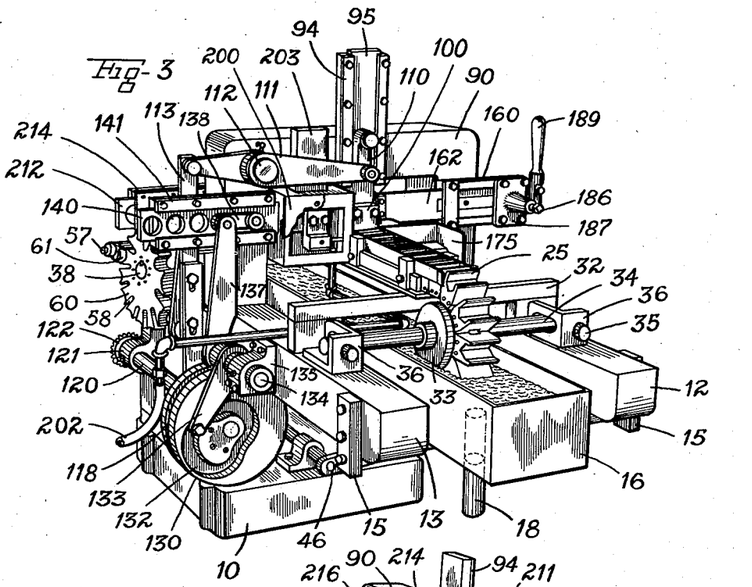
Fig. 3 is a perspective view of the machine from the rearward side.
Figure 10:
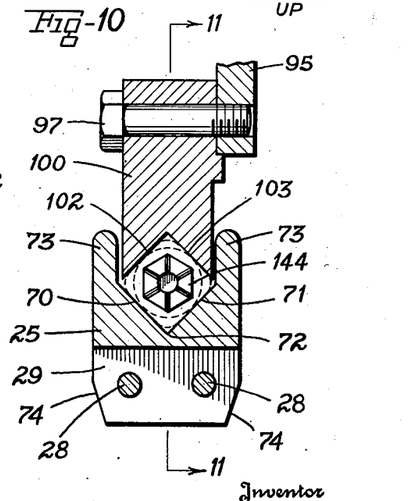
Fig. 10 is a detail view in vertical longitudinal section through the fruit receiving bucket with the clamp in holding position therein.

The date receiving buckets are shown more clearly at 25 in Figs. 2 and 10 and are mounted on a pair of sprocket chains 26 (Fig. 11) to which they are secured by a pair of pins 28 passing through the lower portion of each of the buckets, the bottoms of the buckets being inwardly recessed as shown at 29. The buckets are guided and firmly supported on their forward travel by side guides 30 (Fig. 11) and bottom plate 31 to which the guides are secured. Plate 31 is supported by cross bars 32 from side rails 12, 13, thus assuring that the buckets will travel in a definite line and into predetermined position for the stripping operation.

Figure 5:
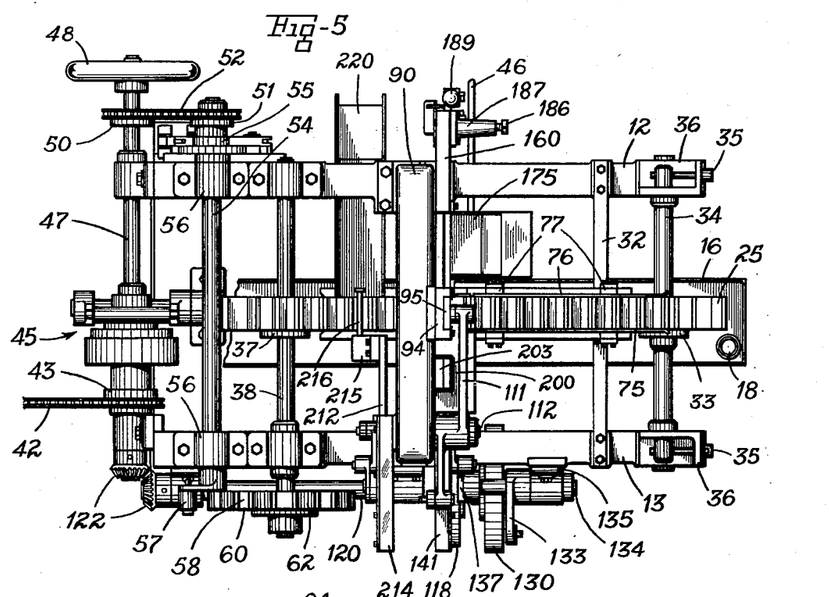
Fig. 5 is a top plan view of the machine with the feeding tray removed.

The sprocket chain passes over a sprocket wheel 33 at the feed end of the machine, the sprocket wheel being loosely mounted on a cross shaft 34 which is positioned by adjustable studs 35 in brackets 36 fixed to the side rails 12 and 13. At its opposite end the sprocket chain passes over another sprocket wheel 37 which is keyed to a drive shaft 38 (Fig. 5).

Figure 6:
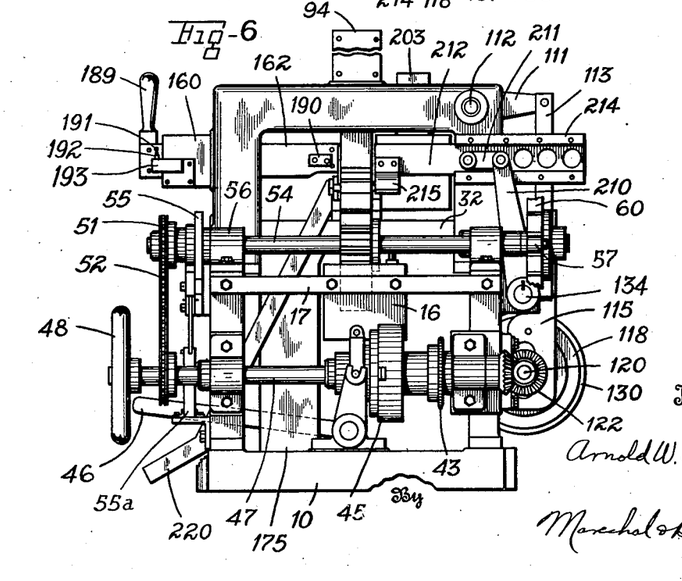
Fig. 6 is an end elevational view from the drive end of the machine.

Drive means are provided for rotating the shaft 38 and with it the sprocket wheels 33 and 37 with a step-by-step motion, providing for advancing the buckets one at a time in a series of feeding steps. This drive is provided by means of a drive motor indicated at 40 having a sprocket wheel 41 connected by sprocket chain 42 to a driven sprocket 43. A manually operated clutch indicated at 45 (Fig. 6) and controlled by lever 46 provides for establishing a drive connection from the sprocket wheel 43 to the main drive shaft 47. Thus when the clutch is disengaged the entire machine is stopped and when the clutch is engaged, the drive shaft 47 is driven from the motor.

The shaft 47 carries a hand wheel 48 by means of which the machine may be turned over slowly by hand, and also carries a sprocket wheel 50 driving a second sprocket 51 through sprocket chain 52. Sprocket 51 is arranged to drive a cross shaft 54 through an electrically energized single revolution clutch 55 which is controlled by means of the solenoid 55a. When the solenoid is energized, the clutch is engaged and the drive is established to shaft 54. This is a normal operating condition, but when the solenoid is deenergized the clutch is disconnected and shaft 54 is no longer driven.

Shaft 54 extends across the machine being mounted in suitable bearing brackets 56, and at its overhanging end carries a drive pin 57 which is adapted to engage the slots 58 in a Geneva gear member 60. A sector 61 is also carried on the end of shaft 54 and has engagement with the grooves 62 of the Geneva gear, this mechanism thus forming the usual Geneva motion which provides for producing steps of rotation of the gear 60 when driven from the continuously rotating shaft 54, and providing for holding the Geneva gear in stationary position between steps of movement. Gear 60 is fixed to shaft 38, and thus provides the desired intermediate advancing motion for the sprocket chain 26 and the series of buckets 25.

The particular shape of the buckets is important and is selected with respect to the particular size and shape of the fruit being handled. In the handling of any fruit there are certain size variations which must be taken care of, and that is particularly important in a machine for the pitting of fruit where the pit is intended to be engaged and pressed out of the fruit in a longitudinal direction. In the case of a date for example the pit itself is relatively small in cross section in comparison with its length, and the proper receiving and supporting of all of the dates to be pitted, notwithstanding variations in individual size, becomes a matter of considerable importance.

Figure 11:
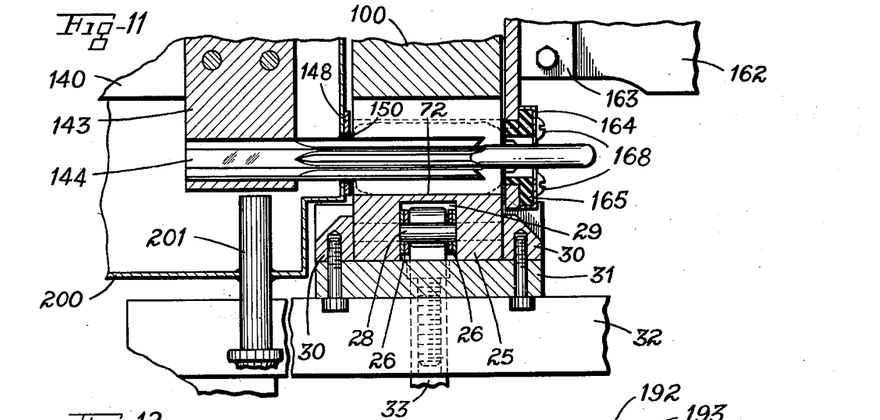
Fig. 11 is a vertical sectional view on the line 11—11 of Fig. 10.

As shown in Figs. 2, 10 and 11 the date receiving bucket is provided with a lower fruit supporting surface which is defined by two surfaces 70, 71 which extend at a definite angle to each other, meeting at an apex 72 which is substantially centrally located with respect to the entire bucket. It is found convenient to so form these supporting surfaces that they meet at substantially a right angle, although this is not entirely essential. The sides 73 extend upwardly beyond surfaces 70, 71 in substantially parallel relation forming a pocket for receiving the date longitudinally therein. The lower sides of the buckets are beveled as shown at 74 (Fig. 10) to facilitate freedom of travel of the buckets around the sprocket wheels.

As shown in Fig. 2, the buckets on their lower run dip into the water tank 16, and are both washed and cooled in so doing.

The dates are adapted to be placed in the buckets by hand, extending longitudinally thereof, the operator picking up the dates and placing one date in each of the series of buckets as they advance through the feed tray 20, preferably placing the stem end of the dates on the right as the machine is shown in Figs. 2 and 11. The buckets are substantially wider at their top than the dates and thus free and ready access is provided to the buckets which may be loaded by the operator using both hands and at a relatively high rate of speed. The buckets travel forwardly between a pair of fixed side plates 75, 76 which are mounted upon brackets 77 carried by side guides 30; these side plates 75, 76 thus in effect close the ends of the buckets.

The mechanism for performing the stripping operation is carried by and upon a yoke 90 which has supporting portions 91 by means of which it is carried upon the two side rails 12 and 13, the yoke extending across and above the path of travel of the feed buckets. The yoke 90 carries vertically extending guides 94 for a slide 95 to the lower end of which there is bolted by means of bolts 97 the clamping member 100 (Figs. 10 and 11). This clamp member is of substantially the same length crosswise as the buckets themselves, but is narrower than the buckets so that it is adapted to enter between the upstanding flanges 73 at the upper edges of the buckets. The lower fruit engaging surface of the clamp is formed with two angularly related surfaces 102, 103 which are arranged at an angle with respect to each other in substantially the same manner as surfaces 70, 71 of the individual bucket. Also as shown these surfaces preferably extend at approximately right angles to each other. Fig. 10 shows the clamp in its lowermost clamping position within the bucket, from which it will be evident that while the clamp approaches the supporting surface of the bucket and is received inwardly of side walls 73, at no time does it actually contact any part of the bucket.

From the above description it will be understood that when a date is placed in a bucket, it will seat itself upon the surfaces 70, 71 in a central position above apex 72. Assuming for example that it is a relatively small date, as indicated by the inner dotted line circle in Fig. 10, it will contact those surfaces at only two lines, the body of the date being supported well above the lower apex 72.

When the clamp 100 is lowered into clamping position as shown in Fig. 10, its surfaces 102, 103 will similarly engage the top of the date, but since the date is relatively small, there will be practically no compression and the date will retain essentially its same position with the pit properly centered in the space formed by these cooperating surfaces of the clamp and the bucket. Assuming however that the date is larger, as represented by the outer dotted line circle, this clamping action will squeeze out the outer periphery of the date, causing it to fill out the corners to a greater extent, but still retaining essentially its same orientation in the bucket. Thus dates ranging in size are received and clamped in essentially the same position in which they are ready for the stripping operation, the squeezing action being insufficient to seriously break down the structure of the fruit.

The slide 95 is arranged to be reciprocated by means of connection through a link 110 to a rocker arm 111 pivoted at 112 upon the yoke 90. Link 113 connects to rocker arm 111 and has a yieldable connection 114 (Fig. 8) with a drive link 115 which is driven by a follower 116 riding in cam track 117 of the drive cam 118, the link being guided for essentially vertical movement by a slide block 119. Cam 118 is carried on drive shaft 120 (Fig. 4) suitably journaled in blocks 121 on pedestals 11. The shaft 120 is driven by bevel gears 122 from shaft 47 so that when the clutch 45 is engaged, the shaft 47 will drive directly through and cause the reciprocating motion of the clamp in definitely correlated relation to the entire operating cycle. Normally the clamp operation continues with a direct drive but in the event that any obstruction occurs, such as a solid object or the presence of more than one date, or the date standing crosswise rather than lengthwise in the bucket, the flexible connection 114 will yield without damaging the machine.

A drive is also provided for the stripping plunger, this drive being actuated from the same drive shaft 120. For this purpose the shaft 120 carries a second internal cam 130 having a cam track 131 therein in which there is a follower pin 132. Pin 132 is adapted to rock a lever 133 rotatably mounted upon a shaft 134 which is suitably supported in brackets 135 on side rail 13.

A lever 137 is keyed to the shaft 134 and is connected through link 138 to a slide 140 which operates laterally through a guide 141 carried upon the yoke 90. The slide 140 is provided with a downwardly extending bracket 143 and the stripping plunger 144 is directly carried by this bracket.

Figures 12, 13, 14, 15:
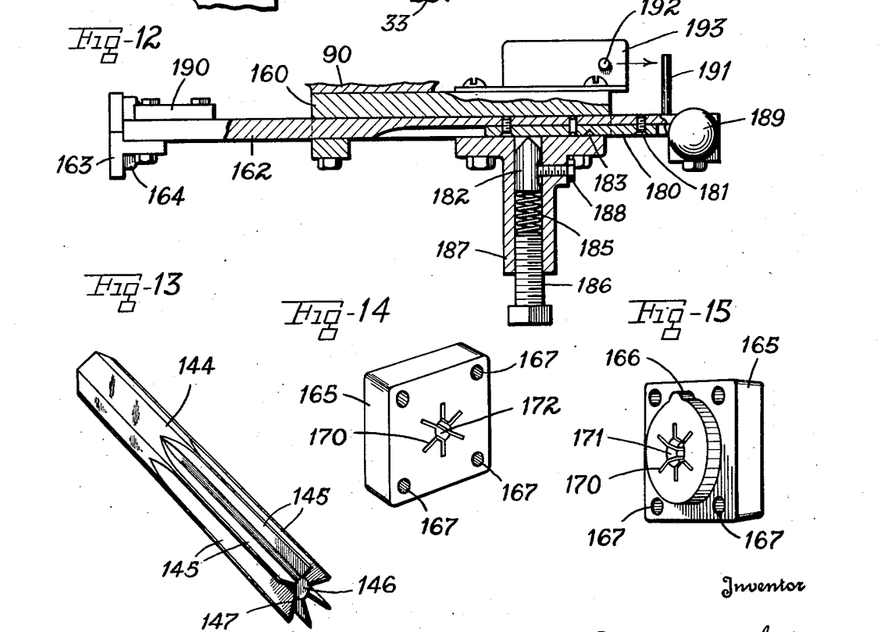
Fig. 12 is a view partly in plan and partly in horizontal section showing the detent mechanism associated with the stripper plate support.
Fig. 13 is a perspective view of the stripper plunger.
Figs. 14 and 15 are perspective views of the rear and front sides of the stripper plate, respectively.

The stripping plunger is of definitely predetermined size and shape and is shown in perspective in Fig. 13. It has a solid shank portion which is preferably hexagonal in cross section by means of which it is secured in bracket 143 while its operating end is formed with a series of flutes 145, which are relatively narrow in thickness, and which radiate outwardly from a central core 146. Also as shown the operating end of the plunger is recessed as shown at 147 so that the outer portion of these blades extends farther, the blades being uniformly tapered inwardly to the central core. Preferably both the side edges and the inner ends of the flutes are relatively sharp so that they form cutting edges which will enter the fruit with the minimum of tearing and damage thereto. As shown the plunger has six such flutes, such number having been found to be preferable for the pitting of dates. A smaller number of flutes has been found to result in leaving spaces which are large enough in some cases to allow the plunger to enter the fruit without coming in contact with the pit, while a greater number has been found to produce excessive cutting and damage of the body of the date. It will be noted further that the recessed construction allows the date pit to center itself against the center stem, even if the pit should be somewhat off center from the optimum position.

As shown in Fig. 11 side lates 75 and 76 do not extend into the stripping position. In place of side plate 75 there is provided an auxiliary plate 148 having an aperture 150 through which the plunger is received, this plate also serving to retain the date in the bucket during the retracting movement of the plunger. At the opposite side of the bucket in the stripping position the stripper assembly is provided. For this purpose the yoke 90 carries a guide structure 160 (Figs. 2, 5 and 12) which provides for receiving a slide 162 which is mounted for sliding movement in the same direction laterally of the machine as the operation of the stripping plunger. The slide 162 carries a bracket 163 to the lower part of which there is secured a retainer member 164 which removably secures a stripper disk or plate 165. This disk is shown in detail in Figs. 14 and 15, from which it will be seen that it has an indexing rib 166 which provides for mounting the same in one position only in the bracket 164, that being the position in which it is properly coordinated with the stripper plunger. The stripper plate 165 is preferably formed of a yieldable material such as a synthetic rubber which has sufficient flexibility coupled with wear resistance and substantial freedom from any reaction to or from the food material being handled. As shown the plate has a series of mounting holes 167 formed therein which receive the screws 168 by means of which it is secured in position upon bracket 163.

The shape and arrangement of the stripping surface of the plate are quite important. Fig. 15 shows the shape of the plate on the entering side of the pit from which it will be seen that there are the series of slots 170 corresponding in number, size and arrangement, with the flutes 145 of the stripping plunger, and in addition there is a central recessed or tapered portion 171 which is somewhat larger than the cross sectional dimension of the pit so that when the pit is forced into the plate, under the action of plunger 144, the pit will guide itself into the relatively small central opening 172, the material of the plate between the slots 170 yielding and deforming sufficiently to allow the pit to pass through the opening and to the discharge side thereof. The flutes 145 enter slots 170, and in the final position of the machine, the flutes have penetrated substantially entirely through the plate, the pit thus being completely discharged from the plate and collected in a chute 175 by means of which the pits are removed from the machine.

The slide 162 is normally held against movement away from the stripping position by means of a detent arrangement shown in Fig. 12. This structure includes a hardened plate 180 fastened to the face of the slide 162 by means of screws 181 and with a detent plunger 182 having a pointed end normally received in a recess 183 in the hardened plate. The plunger is yieldably urged into retaining position in the recess by means of spring 185 adjustable through screw 186, such detent assembly being carried by a bracket plate 187 secured to the support 160, the movement of the detent plunger being limited by screw 188. A handle 189 provides for manual operation of the slide to restore it to normal position.

Figures 18, 19:
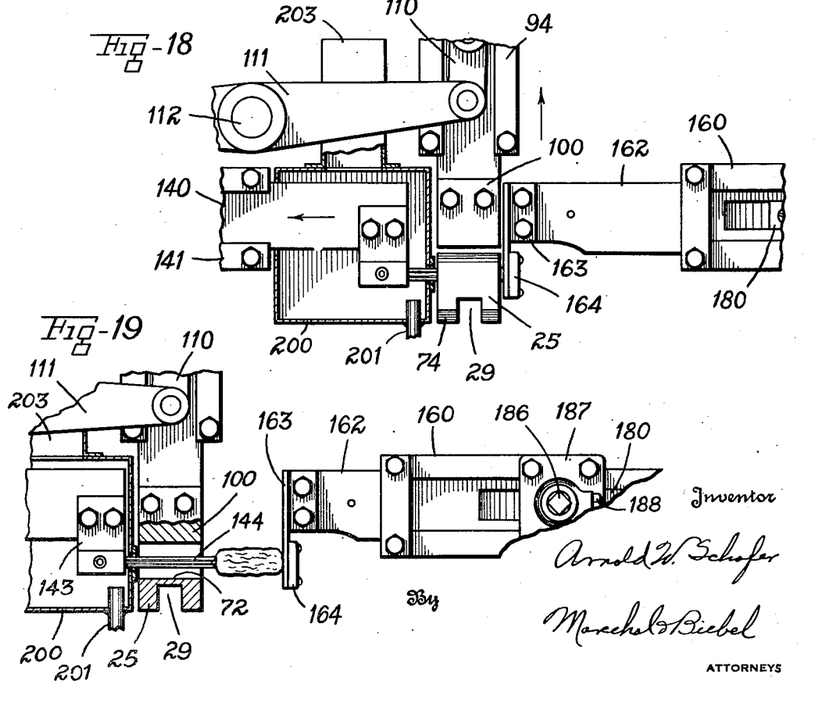
Fig. 18 is a view of the same parts at a later point in the cycle after the clamp has been withdrawn and with the stripping plunger still retaining the fruit in position in the bucket.
Fig. 19 is a view of the same parts showing the conditions when the pit of the fruit is not properly stripped, resulting in the stoppage of the forward travel of the buckets.

Fig. 12 shows the slide in abnormal position, that is, where a pit has failed to be stripped from the date (because of being too large, deformed or where the date has become too dry and hard to allow the pit to be stripped therefrom), as a result of which the operating force of the plunger has pressed the stripping plate 165 away from its normal stripping position, causing the entire slide 162 to move to the right as shown in Fig. 2, overcoming the holding action of the detent 182 and moving to the clearance position illustrated in Figs. 12 and 19, its travel being limited by engagement with a stop block 190.

In so moving, slide 162 carries with it a rearwardly extending pin 191 which leaves the operating contact 192 of a micro switch 193 carried by the frame 160. Immediately upon leaving the switch member 192, the micro switch opens its circuit and this controls the deenergization of the solenoid 55a of the single revolution clutch 55. The result is to uncouple the drive to the buckets at clutch 55, stopping the forward travel of the buckets with the particular bucket where the failure occured being allowed to remain in the stripping position. As soon as this occurs the operator is immediately aware that the feed has been discontinued, and may manually clear the machine if release of slide 162 has not already allowed the unstripped date to be discharged, and restore the slide to its normal position by means of handle 189, it being evident that the feed will not commence until the end of the next stripping cycle. With the stripper disk restored to normal position, the stripping plunger may be allowed to make another stroke to complete the stripping of the particular date (its operation not having been interrupted), and if such stroke accomplishes the stripping, the slide will remain in normal position and the operation of the machine will continue without interruption. However if the pit is still not stripped, the same release of the slide will occur as before, and prior to the end of the stroke so that the feed will not continue and the operator will then be able to manually remove the defective date from the stripping position. This assures that either the pit will be stripped from the date before it leaves the stripping position, or both the date and the pit will be discarded and at no time will either a pit, or an unpitted date, be allowed to remain in the buckets for final delivery.

It has been found that precision of operation in the bringing of the buckets successively into stripping position and the retention thereof accurately in such position during the stripping operation, are highly important factors, as even a small error in the relationship of the buckets to the stripping plunger and stripping disk, particularly if cumulated over successive operations, would be highly objectionable. It will be understood from the preceding description that the drive for the buckets including the Geneva motion accurately locates the driving sprocket 37 and through it the portion of the sprocket chain between such sprocket wheel 37 and the stripping position, assuring complete accuracy and uniform positioning of each bucket as it is brought into such stripping position. The tension in the chain may be adjusted by suitably shifting the other sprocket wheel 33 in its supporting brackets 36, but it is evident that such shifting will not affect the accuracy of location of the particular bucket in the stripping position. Thus the mechanism reliably provides a high degree of accuracy in the location of the bucket in the stripping position, notwithstanding normal wear or change in the tension in the sprocket chains 26, and thus the fruit will likewise be accurately and uniformly located for stripping purposes and in desired correlated relation with the stripping plunger 144 and the stripping disk 165.

Figures 16, 17:
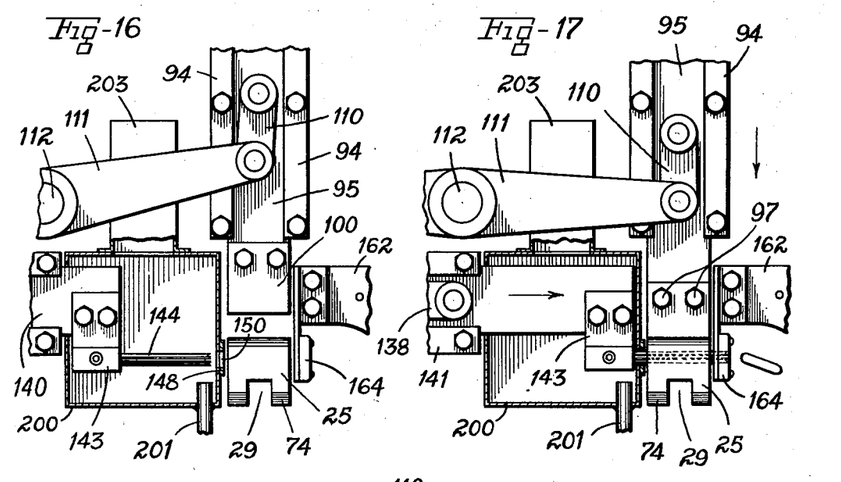
Fig. 16 is a view showing the relationship of the parts in the stripping position at the beginning of a cycle of operation.
Fig. 17 is a view of the same parts at the end of the forward or stripping stroke of the plunger.

In the stripping of the fruit such as dates and the like, the parts which come in contact with the fruit unavoidably pick up a sticky gummy material and it is highly important to provide for keeping the machine in a clean and sanitary condition and likewise to provide for the effective entry of the plunger into the fruit without excessive friction or drag such as might damage the body of the fruit. For this purpose a steam chest 200 is mounted on yoke 90 which encloses the inner portion of the slide 140, the bracket 143 and plunger 144. Low pressure steam is arranged to be continuously introduced through an open pipe 201 which is suitably supplied from a flexible steam line connection 202. As shown in Figs. 16 and 17 for example the pipe 201 is preferably located so that it discharges immediately upon plunger 144. A chimney 203 connects to the top of the steam chamber to allow escape of any excess steam and the condensation may be suitably collected and withdrawn. The auxiliary plate 148 may be conveniently mounted on the side wall of the steam chest.

The application of the steam flow to the plunger 144 thus occurs following each stripping cycle thereof. This both warms and lubricates the plunger, maintaining it in an essentially clean condition and raising its temperature above that of the dates themselves. This correlation of means for cooling the buckets, and keeping the dates correspondingly cool during their travel therethrough, with the stripper plunger which is warmed and lubricated by the condensation of the steam thereon, has been found to be highly desirable in facilitating the operation of the plunger and avoiding damage to the body of the fruit.

Figures 7, 8:
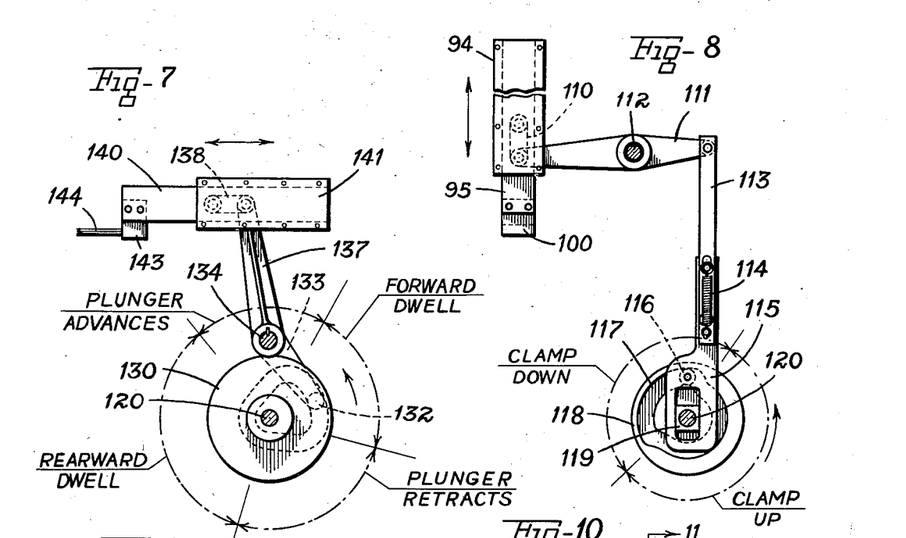
Fig. 7 is a detail view showing the mechanism and cycle of operation for the stripping plunger.
Fig. 8 is a detail view showing the mechanism and cycle of operation for the clamp.
Figure 9:
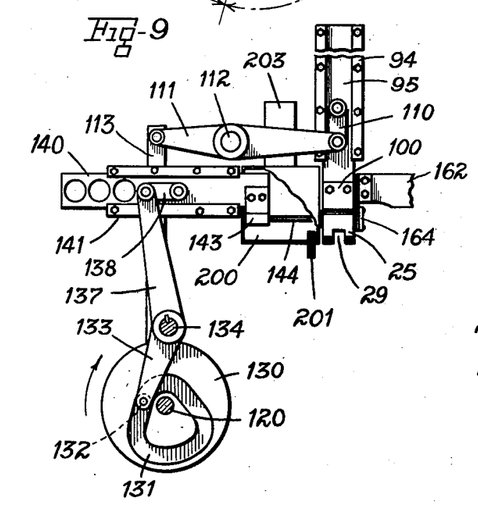
Fig. 9 is a combined view showing the mechanism for stripping and clamping in coordinated relation.

It has also been found important to assure that the clamp 100 will be withdrawn from contact with the upper surface of the date in the stripping position prior to the time the stripping plunger is removed therefrom. Thus any tendency for the stripped date to stick to the lower surface of clamp 100 is prevented by the fact that the date is held down in position in the bucket by reason of the plunger 144 remaining therein. This is illustrated in Fig. 18 in which the clamp has been retracted to a clearance position above the bucket, while the plunger 144 still remains at least partially within the body of the date. These correlated operations are accomplished through the proper shaping and timing of the cams 118 and 130, as illustrated in Figs. 7 and 8, the plunger advancing, retracting and dwelling in the cycle indicated and in continuously timed relation with the operation of the clamp. It will be understood that clutch 55, after being disconnected by solenoid 55a, does not reestablish the drive connection to shaft 54 for advancing the buckets until a definite point in the cycle of drive sprocket 51 which corresponds with the rearward dwell position of the plunger and the up position of the clamp so that the machine operation is at all times completely coordinated.

Figure 4:
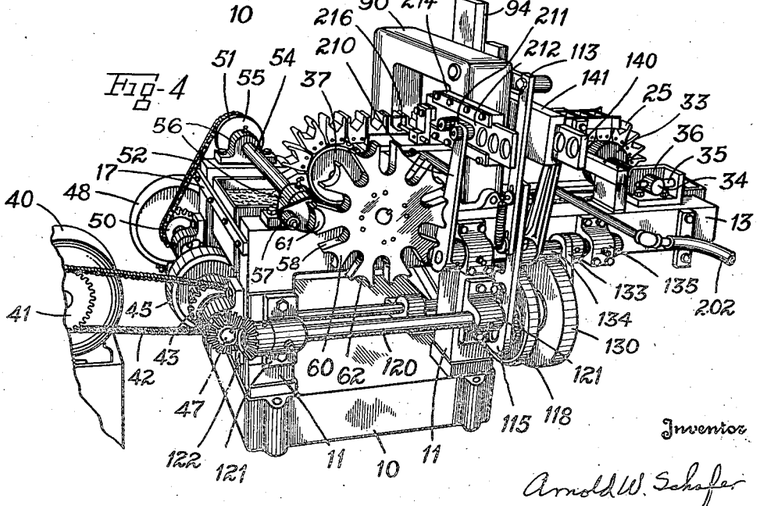
Fig. 4 is a perspective view of the machine looking toward the discharge end thereof.

After the date has left the stripping position, it advances with the buckets to a discharge position on the opposite side of yoke 90. As shown in Fig. 4, shaft 134 extends to this side of yoke 90 and there carries a lever arm 210 which is connected through link 211 with a slide 212 mounted in guides 214 suitably secured to the side of yoke 90. Slide 212 carries a depending bracket 215 in which there is mounted a rod 216 that is in position to enter the bucket laterally and to remove the pitted date therefrom. It will be understood that slide 212 is actuated in the same cycle as the slide 140 which operates the stripping plunger, being operated by the same mechanism and thus in similarly timed relation thereto. The dates fall into a trough 220 from which they are delivered to any suitable point and are collected.

The machine thus provides for the rapid and effective pitting of fruit, assuring that all of the fruit which is delivered by the machine will be pitted, and without the likelihood of any unpitted fruit remaining therein. The pitted fruit has not been slit, crushed, nor broken, so that it retains essentially its normal structure and thus presents both improved appearance as well as highly complete qualities adapting it for shipment, and attractive display. The machine is simple and reliable in operation, and is so constructed that it may easily be cleaned and maintained at all times in a sanitary operating condition. While the machine has been described primarily with reference to the pitting of dates, it may also be utilized advantageously for the pitting of other fruit such as prunes and the like by suitably modifying the size and shape of the stripping plunger and stripper disk.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A machine adapted for the pitting of fruit such as dates and the like which comprises a series of buckets each adapted to receive a fruit longitudinally therein, means for advancing said buckets in step by step movements to bring each of them successively into a stripping position, a stripper plate at said stripping position, means for yieldably mounting said stripper plate providing for the yielding movement thereof away from said bucket in response to failure of the pit to be stripped therethrough, a plunger for stripping the pits from said fruit in said stripping position, means for reciprocating said plunger to strip each fruit in said stripping position, and means responsive to said yielding movement of said stripper plate for stopping the step by step travel of said buckets.

2. A machine adapted for the pitting of fruit such as dates and the like which comprises a series of buckets each adapted to receive a fruit longitudinally therein, means for advancing said buckets in step by step movements to bring each of them sucessively into a stripping position, a stripper plate at said stripping position, means for yieldably mounting said stripper plate providing for the yielding movement thereof away from said bucket in response to failure of the pit to be stripped therethrough, a plunger for stripping the pits from said fruit in said stripping position, means for reciprocating said plunger to strip each fruit in said stripping position, and means responsive to said yielding movement of said stripper plate for stopping only the step by step travel of said buckets while continuing the reciprocating travel of said plunger to strip the pit from the fruit in said stripping position.

3. A machine adapted for the pitting of fruit such as dates and the like which comprises a series of buckets for receiving the fruit therein, means for advancing said buckets in step by step movements to bring each of them successively into a stripping position, a reciprocable stripping plunger operable in a stripping cycle to engage the fruit while in said stripping position, means for driving said reciprocating plunger, clutch means for controlling the advancing means for the movement of said buckets, means responsive to failure of said stripper to discharge the pit from the fruit, means operable automatically by said responsive means for disconnecting said clutch upon said failure to discharge, and means for reengaging said clutch only in predetermined correlated relation with the stripping cycle following interruption thereof.

ARNOLD W. SCHAFER.

REFERENCES CITED

The following references are of record in the file of this patent:

UNITED STATES PATENTS

| Number | Name | Date |
| --- | --- | --- |
| 687,022 | Harris | Nov. 19, 1901 |
| 928,958 | Gilson | July 27, 1909 |
| 1,329,023 | Scott | Jan. 27, 1920 |
| 1,392,690 | Leonard | Oct. 4, 1921 |
| 1,421,505 | Leonard | July 4, 1922 |
| 1,694,263 | Howson | Dec. 4, 1928 |
| 1,924,678 | Curtiss | Aug. 29, 1933 |
| 1,940,276 | Smith | Dec. 19, 1933 |
| 2,123,644 | Wormser | July 12, 1938 |
| 2,454,660 | Leonard | Nov. 23, 1948 |